United States Patent [19]
Russell

[11] 3,874,810
[45] Apr. 1, 1975

[54] DRILL GUIDE

[75] Inventor: William D. Russell, Chula Vista, Calif.

[73] Assignee: Portalign Tool Company, San Diego, Calif.

[22] Filed: June 21, 1973

[21] Appl. No.: 372,328

[52] U.S. Cl. ................. 408/14, 408/99, 408/110
[51] Int. Cl. ............................................. B23b 49/00
[58] Field of Search ............ 408/110, 111, 112, 99, 408/14, 88, 98, 95, 96, 97

[56] References Cited
UNITED STATES PATENTS

| | | | |
|---|---|---|---|
| 1,895,990 | 1/1933 | Harcharick | 408/112 |
| 2,454,372 | 11/1948 | Billeter | 408/241 |
| 2,997,900 | 8/1961 | Pugsley | 408/112 |
| 3,708,238 | 1/1973 | Kissane | 408/112 |

*Primary Examiner*—Gil Weidenfeld
*Attorney, Agent, or Firm*—Robert O. Richardson

[57] ABSTRACT

A rugged, versatile, drill guide of simple design for positioning a drill bit relative to varied workpiece configurations.

7 Claims, 4 Drawing Figures

PATENTED APR 1 1975   3,874,810

DRILL GUIDE

BACKGROUND OF THE PRESENT INVENTION

Drill centering guides are useful in working with flat, concave, convex and irregular surfaces. In assembly line mass production techniques a guide can be provided for the drilling of a hole in any desired position relative to any desired surface on a workpiece. The workpiece can then be moved to a new position and another guide provides for the drilling of another hole in another desired position. In such procedure the guide set-up is seldom changed and therefore the use of a drill guide that is versatile and easily adaptable to new positions and workpiece configurations is not necessary.

In using portable electrical drills in the manner of a craftsman wherein a drill is used in several operations on a single workpiece, the drill guide must be quickly converted and easily adapted to its new use in a different position on the workpiece. Provision must be made for convenient reliable attachment to the drill motor or rotary shaft and fast easy separation from it after it has served its purpose. The guide must be of simple, durable and inexpensive construction, quickly and easily mounted and accurate in its operation. Until the present invention no such structure has been available to serve these functions.

SUMMARY OF THE PRESENT INVENTION

In accordance with the present invention a drill guide has been provided for supporting and aligning the rotary shaft of a drill motor or other power tool with workpieces of varied configurations. With its use a hole may be drilled through the diameter of a rod or a vertical hole may be made through a flat surface, a relatively thin edge or strip, a corner or curved surface, or a surface of irregular configuration. Instead of a cutting drill bit, any polishing, scraping or buffing device held in a drill chuck may be used. The interchangeability of the drill guide from one mode of operation to another is simple, fast and easy, making the drill guide a convenient, if not necessary, accessory for drill motor use.

SUMMARY OF THE PRESENT INVENTION

In accordance with the present invention a drill guide has been provided for supporting and aligning the rotary shaft of a drill motor or other power tool with workpieces of varied configurations. With its use a hole may be drilled through the diameter of a rod or a vertical hole may be made through a flat surface, a relatively thin edge or strip, a corner or curved surface, or a surface of irregular configuration. Instead of a cutting drill bit, any polishing, scraping or buffing device held in a drill chuck may be used. The interchangeability of the drill guide from one made of operation to another is simple, fast and easy, making the drill guide a convenient, if not necessary, accessory for drill motor use.

The drill guide in one form consists of spaced, diametrically opposed support rods telescopically engageable with a circular base plate having an enlarged central aperture through which a drill bit may pass when engaging the workpiece. Diametrically opposed V-shaped grooves on the surface of the base plate serve as a cradle for pipe, rod or other round objects into which a drill hole is to be made. Slidably mounted across the support rods is a drill motor support in which is journalled a rotary spindle, the upper end of which is internally threaded to receive the externally threaded end of the drill motor shaft. This is the sole support for the drill motor, the lower end of the spindle is externally threaded to receive the drill chuck or other tool holder. The handle of the electric drill is used to manually move the drill motor support downwardly on the support rods to move the drill bit into the workpiece as the drill bit rotates. An adjustable limit stop collar on one of the support rods limits the downward movement and drill bit penetration.

DETAILED DESCRIPTION OF ILLUSTRATIVE EMBODIMENT

Figure 1:
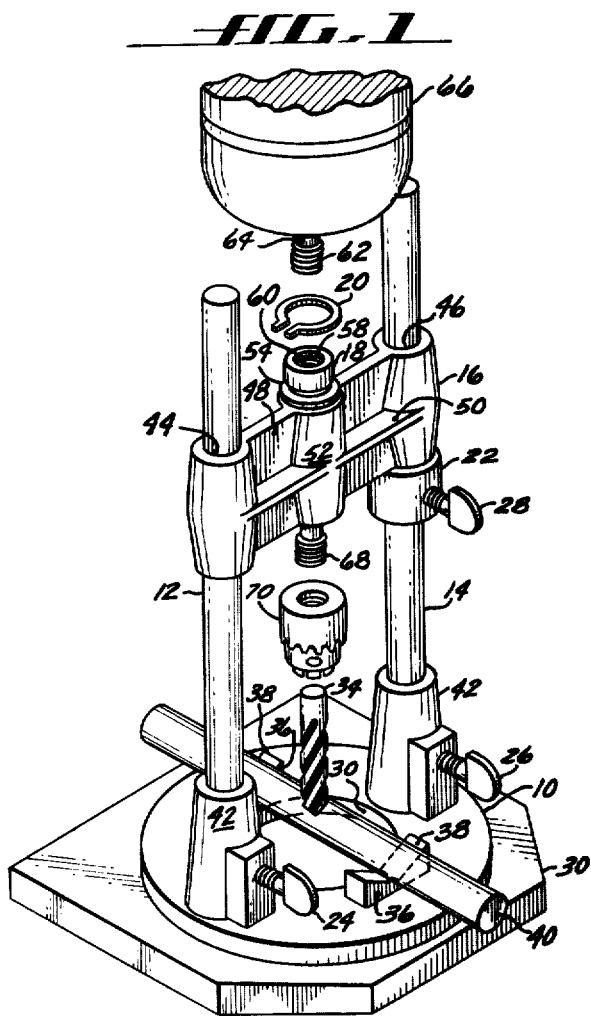
FIG. 1 is a perspective view of the drill guide with the drill motor, chuck, and bit in exploded position to show the relationship of the parts.

Reference is now had to FIG. 1 which shows the drill guide in perspective. This drill guide consists of a circular base plate 10, diametrically opposed support rods 12, 14, drill motor support 16 with spindle 18 and retaining pin 20, limit stop collar 22 and locking thumb screws 24, 26 and 28. The base plate 10 rests on a flat workpiece 30 and has an aperture 32 through which a drill bit 34 may pass into the workpiece to drill a hole therein. Obviously a buffing or polishing instrument may also be used instead of the drill bit if desired. Plate 10 has a pair of diametrically opposed projections 36 on its upper surface having V-shaped grooves 38 thereon to receive and cradle a rod 40, tube or other cylindrical object therein as a workpiece into which a hole is to be drilled. Plate 10 has a pair of diametrically opposed bosses 42 through which a pair of support rods 12, 14 are telescopically moveable, vertically adjustable, and secured by thumb screws 24, 26. Appropriate apertures (not shown) in plate 10 permit downward insertion of the rods below the plate, such as can be seen in FIGS. 2, 3 and 4.

Drill motor support 16 extends between support rods 12, 14 and has openings 44, 46 into which rods 12 and 14 are received. Vertical and horizontal ribs 48, 50 lend structural integrity to the support. Centrally positioned and vertically orientated on the support 16 is a housing 52 having a bushing 54 therein. Spindle 18 is rotatably mounted in bushing 54 and is vertically retained therein by upper retaining pin 20 and a lower retaining pin 56 (shown in FIGS. 2 and 4). The upper end of spindle 18 has a bore 58 with female threads 60 adapted to mate with male threads 62 on drill motor shaft 64 which is rotatably mounted in drill motor housing 66. The lower end of spindle 18 has male threads 68 adapted to engage drill chuck 70. The drill chuck 70, of course, is adapted to hold drill bit 34. A limit stop collar 22 is vertically positionable on support rod 14 and retained in position by set screw 28. This limits the downward penetration of drill bit 34 into rod 40 or workpiece 30.

Figure 3:
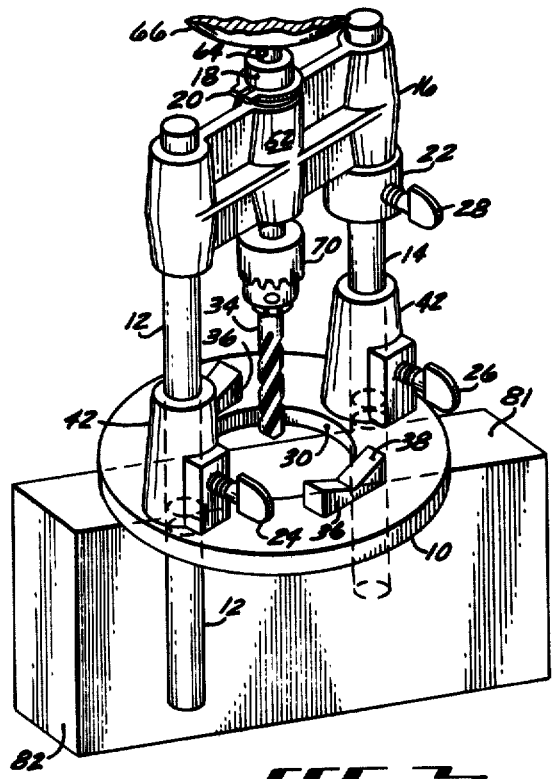
FIG. 3 is a perspective view showing the technique of drilling into a thin narrow surface.
Figure 2:
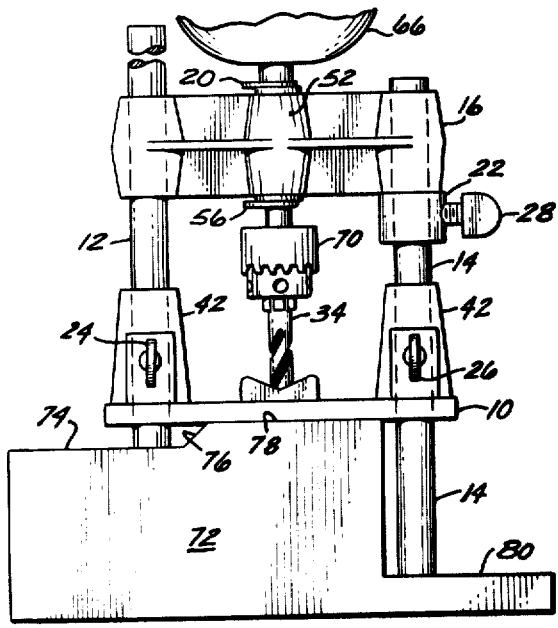
FIG. 2 is a side elevational view of the drill guide used in drilling on an irregular surface.
Figure 4:
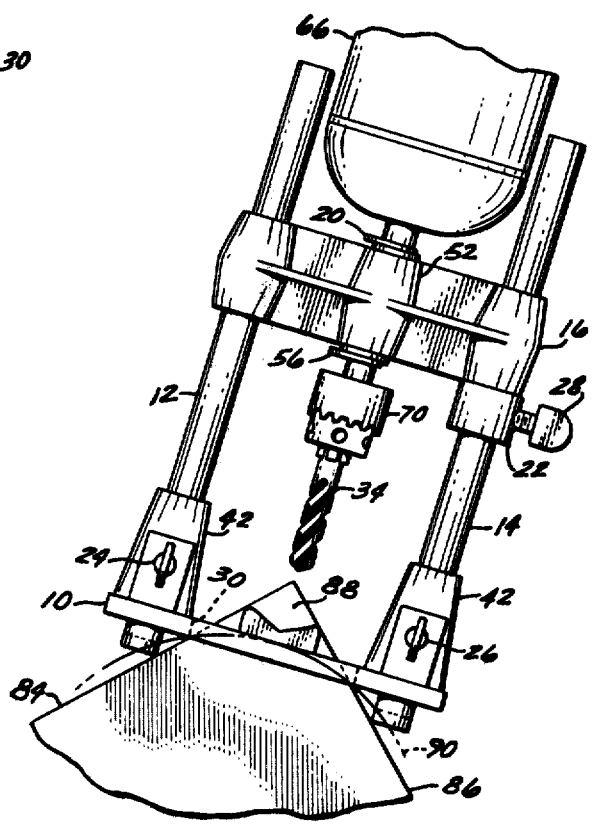
FIG. 4 is a plan view showing the technique of drilling into a corner or round surface.

The additional versitility of the foregoing drill guide is illustrated in FIGS. 2, 3 and 4. In FIGS. 2 there is shown a workpiece 72 having an irregularly configured top surface consisting of surfaces 74, 76, 78 and 80.

Base plate 10 rests upon surface 78 while the lower ends of legs 12 and 14 protrude downwardly below base 10 to engage surfaces 74 and 80 respectively. In this manner drill bit 34 is vertically orientated for making a hole into workpiece 72.

In FIG. 3 there is shown a technique for drilling holes in narrow strips such as in the making of dowel rod holes for frames and other purposes. The holes are centered on a surface 81 of workpiece 82 wherein the surface may be of any width up to the distance between legs 12 and 14. The legs 12 and 14 are adjusted to extend their lower ends below ring 10 and to straddle the workpiece 82. When ring 10 is rotated until the legs abut against each of the sides of the workpiece 82, drill bit 34 is centered over surface 81 and its downward movement into the workpiece will be parallel to the sides.

In FIG. 4 there is shown the technique of drilling holes in a corner of a workpiece or along the radius of a covered surface of the workpiece. The axis of drill bit 34 may be aligned or angularly oriented relative to the side edges 84, 86 by extending the ends of legs 12 and 14 below plate 10 the desired amount and letting the corner 88 of the workpiece protrude up through the opening 30 in the plate. The edges 84, 86 preferably will bear against the opening walls. The same technique applies when a curved surface 90 is on the workpiece. The legs 12, 14 and walls of opening 30 bear against the curved surface to permit drill bit penetration at the desired angle.

In view of the foregoing description of an illustrative embodiment it will become apparent to one skilled in the art that various modifications and deviations from the embodiment just described can be made and it is to be understood that these changes are to be construed as being part of the present invention.

What I claim is:

1. A drill guide comprising:

a base plate having a central aperture, parallel diametrically opposed support rods adjustably positioned and attached to said plate, a drill motor support between and slidably mounted on said support rods, said support including a centrally disposed upright housing, a rotatable spindle in said housing, said spindle having means at its upper end for engagement with a drill motor rotatable shaft and means at its lower end for engagement with a drill chuck, and a limit stop collar slidably positionable on one of said rods to limit downward movement of said support on said rods, said plate having apertures therein to permit insertion of the lower ends of said rods below said plate and adjustment means on said plate for adjustably positioning said lower ends in the plane of said plate and below said plate.

2. A drill guide as set forth in claim 1 wherein the axis of rotation of said spindle passes through said aperture.

3. A drill guide as set forth in claim 1 including a pair of diametrically opposed projections on the top surface of said plate, V-shaped grooves on said projections to cradle and center cylindrical objects thereon for drilling holes diametrically therethrough.

4. A drill guide as set forth in claim 1 wherein said support rods are attached to said plate by means of bosses on said plate with said apertures therein to permit slidable movement of said rods therein, and said adjustment means including set screws in said bosses engagable with said support rods to maintain said rods at predetermined positions in said bosses.

5. A drill guide as set forth in claim 4 wherein said plate has said apertures therein below said bosses to permit passage of the lower ends of said support rods below the plane of said plate, whereby said rods can be individually and separately adjusted by said set screws for positioning said plate on an irregular surface for drilling a hole at a predetermined angle relative thereto.

6. A drill guide as set forth in claim 1 including a drill bit received in said drill chuck, whereby holes can be drilled parallel to the side surfaces of a narrow top workpiece, said rods being positioned against said side surfaces and said plate resting on said narrow top.

7. A drill guide as set forth in claim 1 wherein said means at the upper end of said spindle is female threads engageable with male threads on the drill motor shaft and wherein said means at the lower end of said spindle is male threads engageable with female threads on said drill chuck.

* * * * *